(12) United States Patent
Lam

(10) Patent No.: US 7,237,320 B2
(45) Date of Patent: Jul. 3, 2007

(54) METHODS OF ORIENTING AN EASY AXIS OF A HIGH-ASPECT RATIO WRITE HEAD FOR IMPROVED WRITING EFFICIENCY

(75) Inventor: Quan-chiu Harry Lam, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 580 days.

(21) Appl. No.: 10/730,687

(22) Filed: Dec. 8, 2003

(65) Prior Publication Data

US 2005/0120544 A1    Jun. 9, 2005

(51) Int. Cl.
*G11B 5/127* (2006.01)
(52) U.S. Cl. ............. 29/603.08; 360/125; 360/126; 148/108
(58) Field of Classification Search ............. None
See application file for complete search history.

(56) References Cited

U.S. PATENT DOCUMENTS 6,678,125 B2 * 1/2004 Nikitin et al. ............. 360/317

2002/0044381 A1    4/2002 Urai et al.

\* cited by examiner

*Primary Examiner*—John P. Sheehan
(74) *Attorney, Agent, or Firm*—John J. Oskorep, Esq.; Matthew Zises, Esq.

(57) ABSTRACT

A pole piece of a magnetic write head is formed over a substrate and includes a pole tip having a width that is less than its height which is normal the substrate. Due to stress-anisotropy, the pole tip structure has an inherent easy-axis which is oriented in an unfavorable direction (i.e. perpendicular to the ABS and almost collinear with a driving field of the write head). To alleviate this problem, during electroplating or annealing of the pole piece a magnetic field is applied to the pole tip in a direction which is out-of-plane from the substrate but in-plane with a side wall of the pole tip which vertically projects from the substrate. By applying the magnetic field in this manner, the easy axis of the pole piece is oriented in the direction of the applied magnetic field to facilitate more efficient switching in the write head. Ideally, the angle $\theta$ is about 90° for Hexagonal-Closed Packed (HCP) materials or about 50° for Face-Centered Cubic or Body-Centered Cubic (BCC) materials (e.g. NiFe and CoFe).

27 Claims, 10 Drawing Sheets

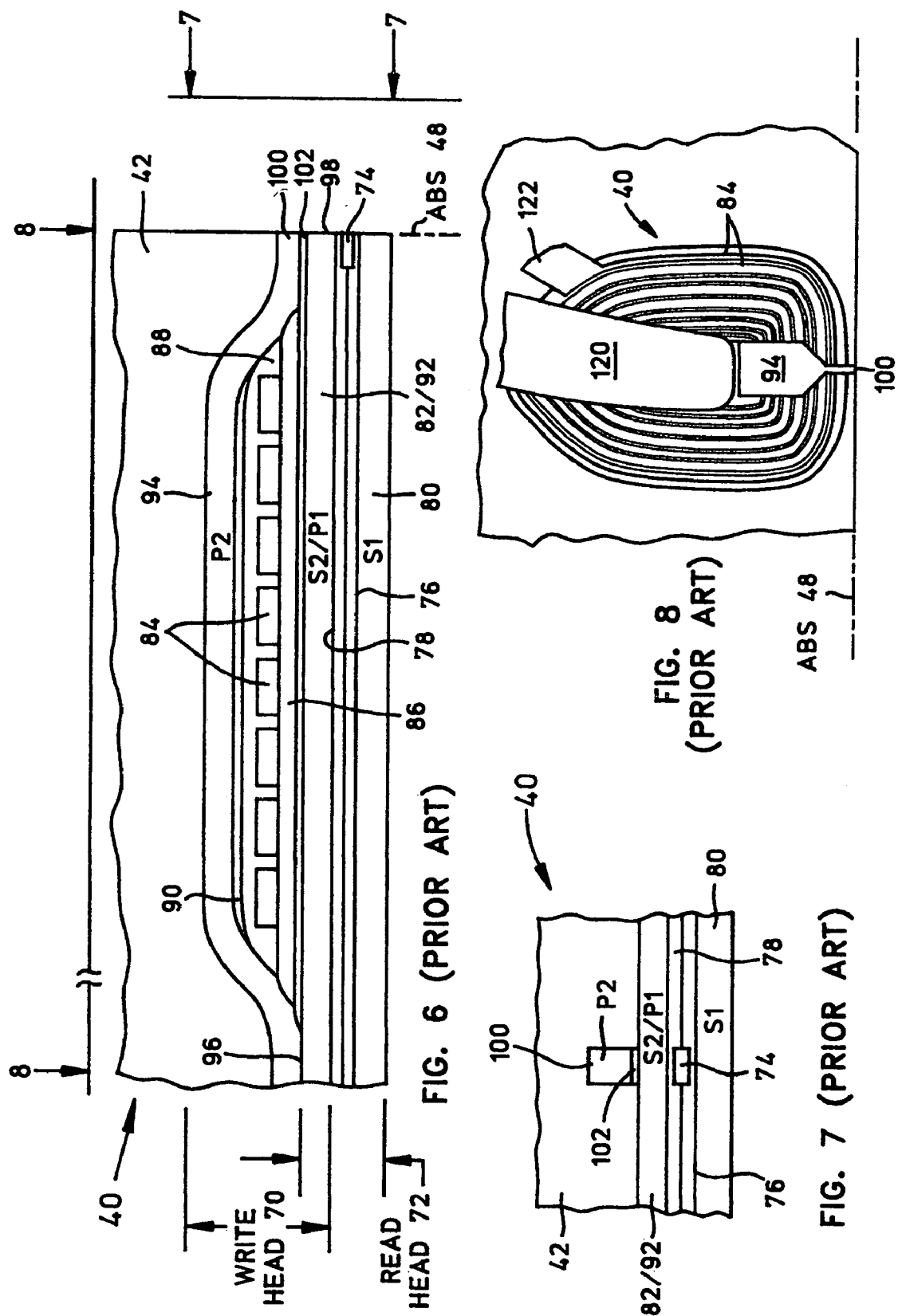

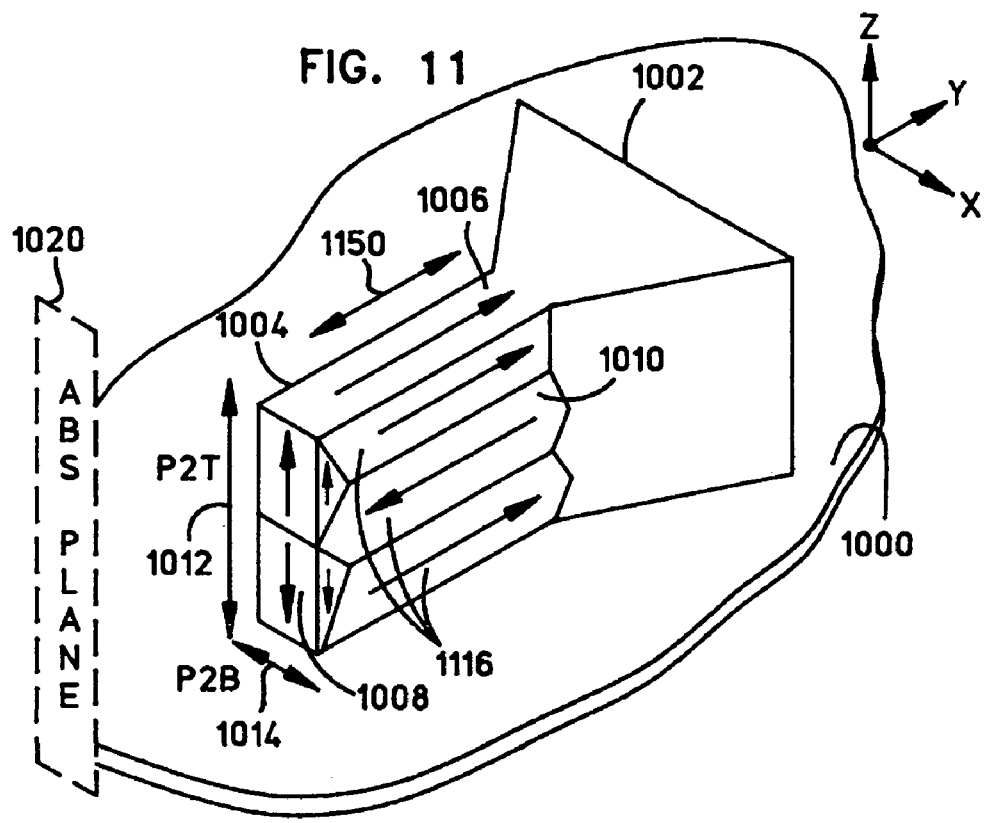
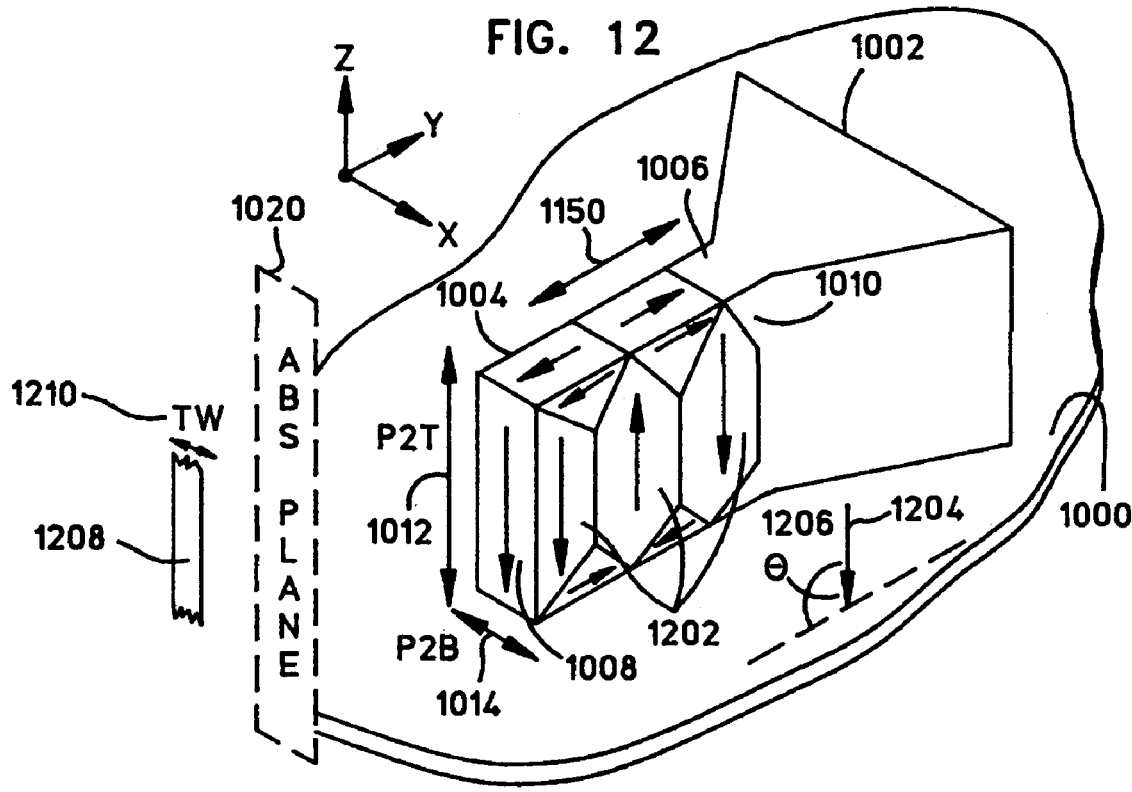

1700 stress-Hk
along driving-H

1800

METHODS OF ORIENTING AN EASY AXIS OF A HIGH-ASPECT RATIO WRITE HEAD FOR IMPROVED WRITING EFFICIENCY

BACKGROUND OF THE INVENTION

1. Field of the Invention

This invention relates generally to methods of orienting an easy axis of a high-aspect-ratio pole piece of a magnetic write head, and more particularly relates to methods of making a magnetic write head which include forming a pole piece over a substrate and applying a magnetic field to a pole tip of the pole piece in a direction forming an angle that is out-of-plane from the substrate and in-plane with a side wall of the pole piece which vertically projects from the substrate.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces using a magnetic head which is formed of pole pieces. A read sensor of the magnetic head is used to read data from the tracks on the disk surfaces.

Traditionally, write heads were formed with pole pieces having heights that were less than their widths. Today, for achieving much greater track densities (i.e. greater tracks per inch or TPI), pole pieces are formed having heights that are greater than their widths. For example, the height-to-width ratio of today's pole tips may be greater than four-to-one (4:1). Such write heads are said to have a "high-aspect-ratio". It has been discovered that conventional magnetic field plating/annealing does not properly set the "easy axis" of pole tips having such high-aspect-ratios. Stress in such pole tips materials is high which causes stress-anisotropy in the pole tip region. The stress-induced $H_k$ has been estimated to be about 100 Oersteds in an unfavorable orientation that is perpendicular to the ABS and essentially collinear with a driving field of the write head (which corresponds to a uniaxial anisotropy constant of about 80e3 erg/cm3 for materials having a saturation magnetization $M_s$ of about 2 Tesla). With the overall easy axis dominated by stress in such unfavorable orientation, switching speed is reduced and is relatively slow since the initial torque exerted by the driving field is small on the magnetization due to the relatively small angle between the field and the magnetization.

What are needed are methods of orienting an easy axis in today's pole pieces to improve writing efficiency.

SUMMARY

A pole piece of a magnetic write head is formed over a substrate and includes a pole tip having a width that is less than its height which is normal the substrate. Due to stress-anisotropy, the pole tip structure has an inherent easy-axis which is oriented in an unfavorable direction (i.e. perpendicular to the ABS and almost collinear with a driving field of the write head). To alleviate this problem, during electroplating or annealing of the pole piece a magnetic field is applied to the pole tip in a direction which is out-of-plane from the substrate but in-plane with a side wall of the pole tip which vertically projects from the substrate. By applying the magnetic field in this manner, the easy axis of the pole piece is oriented in the direction of the applied magnetic field to facilitate more efficient switching in the write head. Ideally, the angle θ is about 90° for Hexagonal-Closed Packed (HCP) materials or about 50° for Face-Centered Cubic or Body-Centered Cubic (BCC) materials (e.g. NiFe and CoFe).

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

FIG. 11 is an illustration of the pole tip of FIG. 10 having an undesirable magnetic domain orientation due to stress-anisotropy;

FIG. 12 is an illustration of the pole tip of FIG. 10 having a desirable magnetic domain orientation which is produced by applying, during electroplating or annealing, a magnetic field in a direction which forms an angle θ out-of-plane from the substrate but in-plane with a wall of the pole tip which vertically projects from the substrate;

DETAILED DESCRIPTION OF THE PREFERRED EMBODIMENTS

A pole piece of a magnetic write head is formed over a substrate and includes a pole tip having a width that is less than its height which is normal the substrate. Due to stress-anisotropy, the pole tip structure has an inherent easy-axis which is oriented in an unfavorable direction (i.e. perpendicular to the ABS and almost collinear with a driving field of the write head). To alleviate this problem, during electroplating or annealing of the pole piece a magnetic field is applied to the pole tip in a direction which is out-of-plane from the substrate but in-plane with a side wall of the pole tip which vertically projects from the substrate. By applying the magnetic field in this manner, the easy axis of the pole piece is oriented in the direction of the applied magnetic field to facilitate more efficient switching in the write head. Ideally, the angle $\theta$ is about 90° for Hexagonal-Closed Packed (HCP) materials or about 50° for Face-Centered Cubic or Body-Centered Cubic (BCC) materials (e.g. NiFe and CoFe).

The following description is the best embodiment presently contemplated for carrying out the present invention. This description is made for the purpose of illustrating the general principles of the present invention and is not meant to limit the inventive concepts claimed herein.

Figure 1:
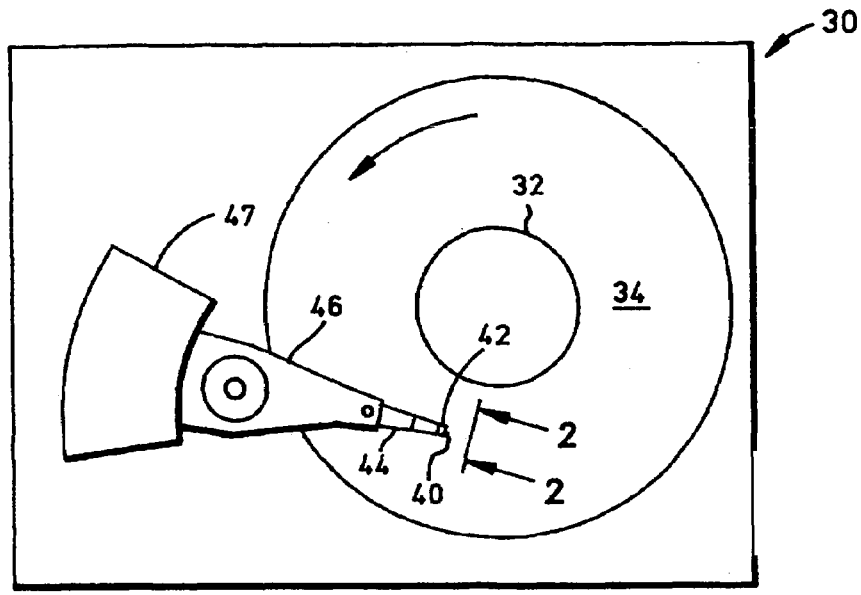
FIG. 1 is a plan view of an exemplary magnetic disk drive.
Figure 2:
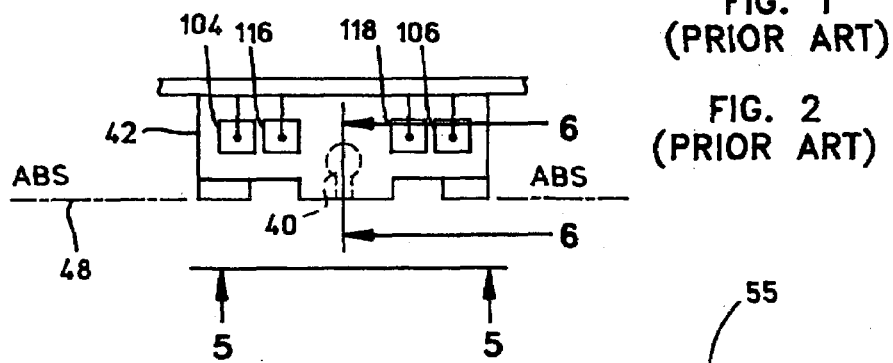
FIG. 2 is an end view of a slider with a magnetic head of the disk drive as seen in plane 2—2 of FIG. 1.
Figure 3:
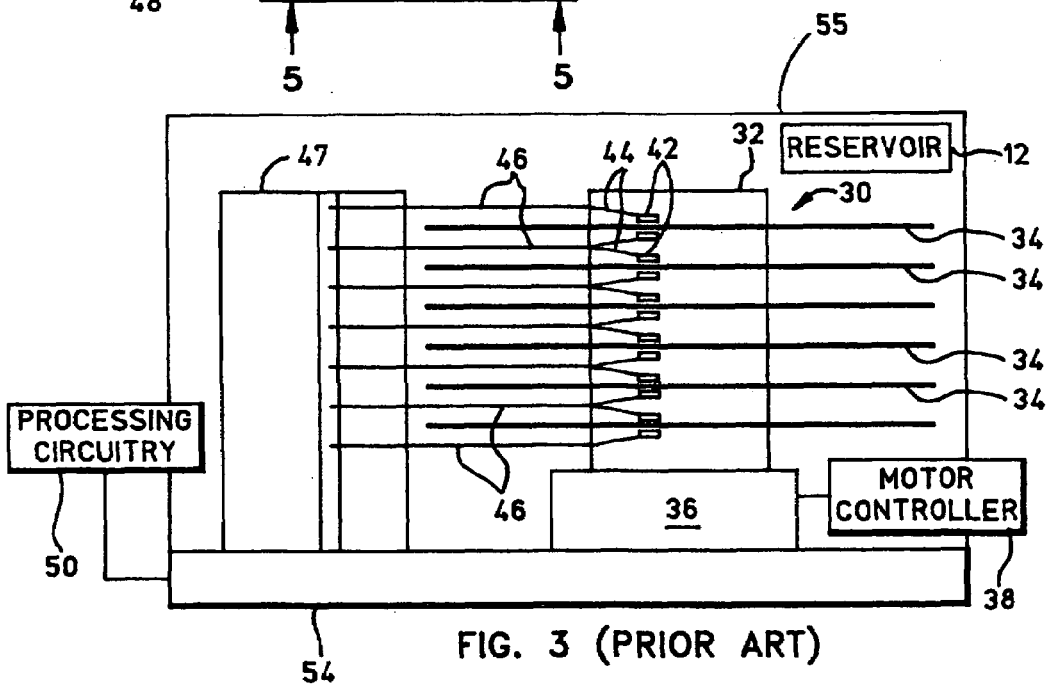
FIG. 3 is an elevation view of the magnetic disk drive wherein multiple disks and magnetic heads are employed.
Figure 4:
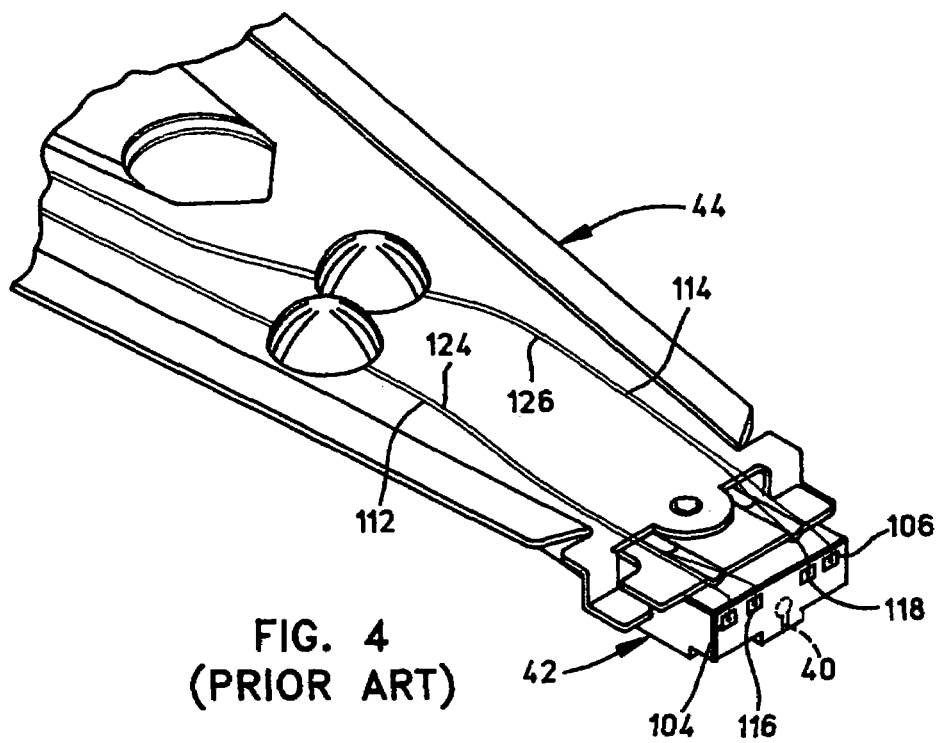
FIG. 4 is an isometric illustration of an exemplary suspension system for supporting the slider and magnetic head.
Figure 5:
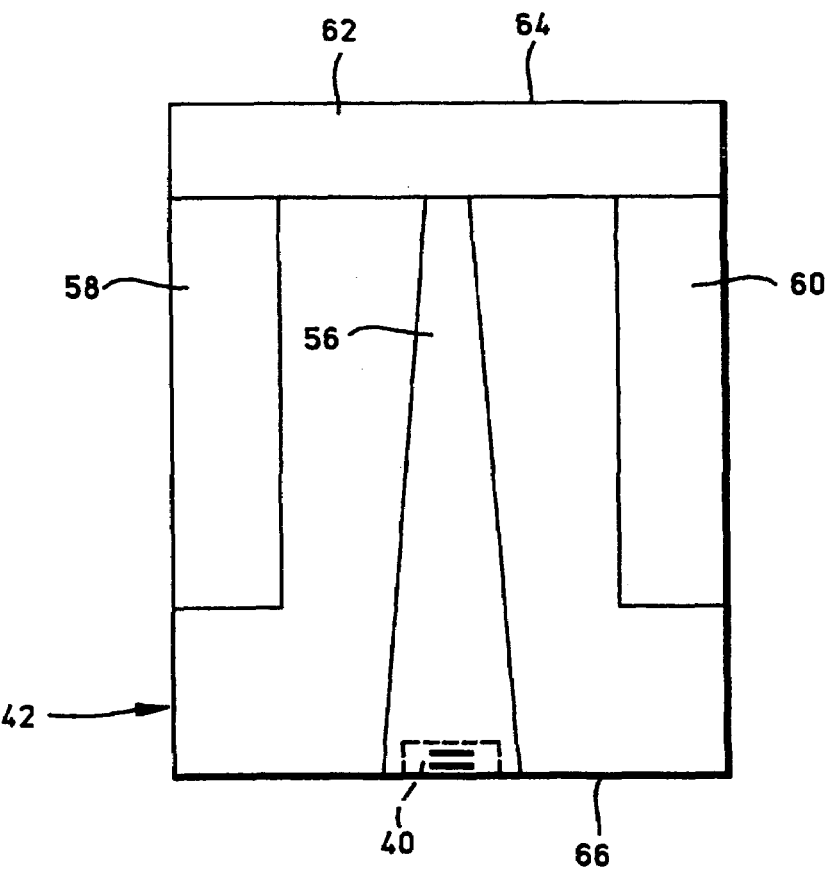
FIG. 5 is an ABS view of the magnetic head taken along plane 5—5 of FIG. 2.

Magnetic Disk Drive. Referring now to the drawings wherein like reference numerals designate like or similar parts throughout the several views, FIGS. 1–3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

FIG. 6 is a side cross-sectional elevation view of a merged magnetic head 40, which includes a write head portion 70 and a read head portion 72. Read head portion 72 includes a giant magnetoresistive (GMR) read head which utilizes a spin valve sensor 74. FIG. 7 is an ABS view of FIG. 6. Spin valve sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of spin valve sensor 74 changes. A sense current Is conducted through the sensor causes these resistance changes to be manifested as potential changes. These potential changes are then processed as readback signals by processing circuitry 50 shown in FIG. 3.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
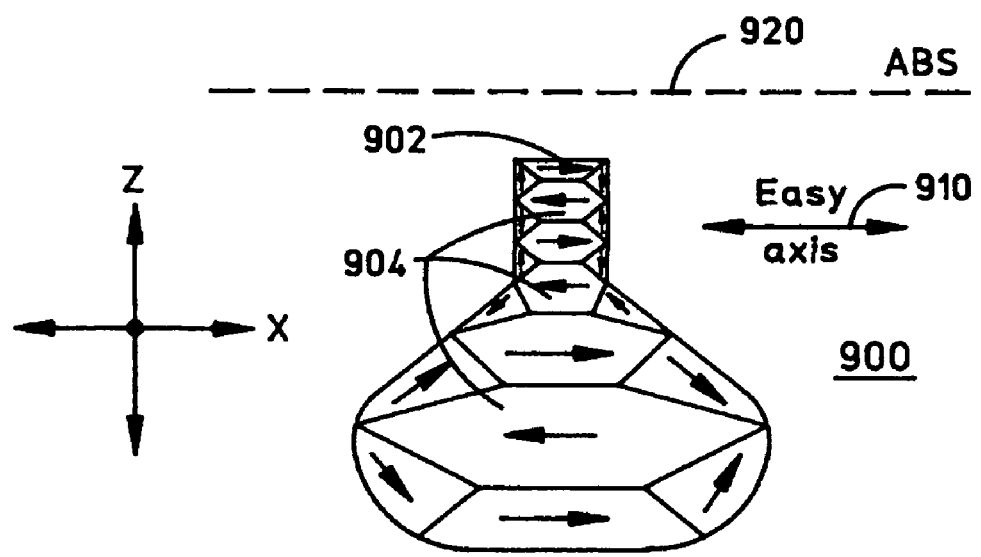
FIG. 9 is an illustration of a magnetic domain orientation of a pole piece of a traditional write head.

FIG. 9 is an illustration of a magnetic domain orientation 904 of a pole piece 900 of a traditional low-track-density write head, which was obtained from C. Denis Mee & Eric D. Daniel, "Magnetic Recording Technology", McGraw Hill, pp. 6–34. In a traditional write head, pole piece 900 is formed with a pole tip having a width 902 that is less than its height (height not visible in FIG. 9). As shown, magnetic domain orientation 904 of pole piece 900 is parallel with width 902 and an air bearing surface (ABS) 920 of pole piece 900. An easy axis 910 of pole piece 900 is similarly orientated in parallel with width 902 and ABS 920. A driving field is provided through pole piece 900 in directions perpendicular to magnetic domain orientation 904 and easy axis 910. For this structure, magnetic domain orientation 904 and easy axis 910 are favorable to the driving field.

Figure 10:
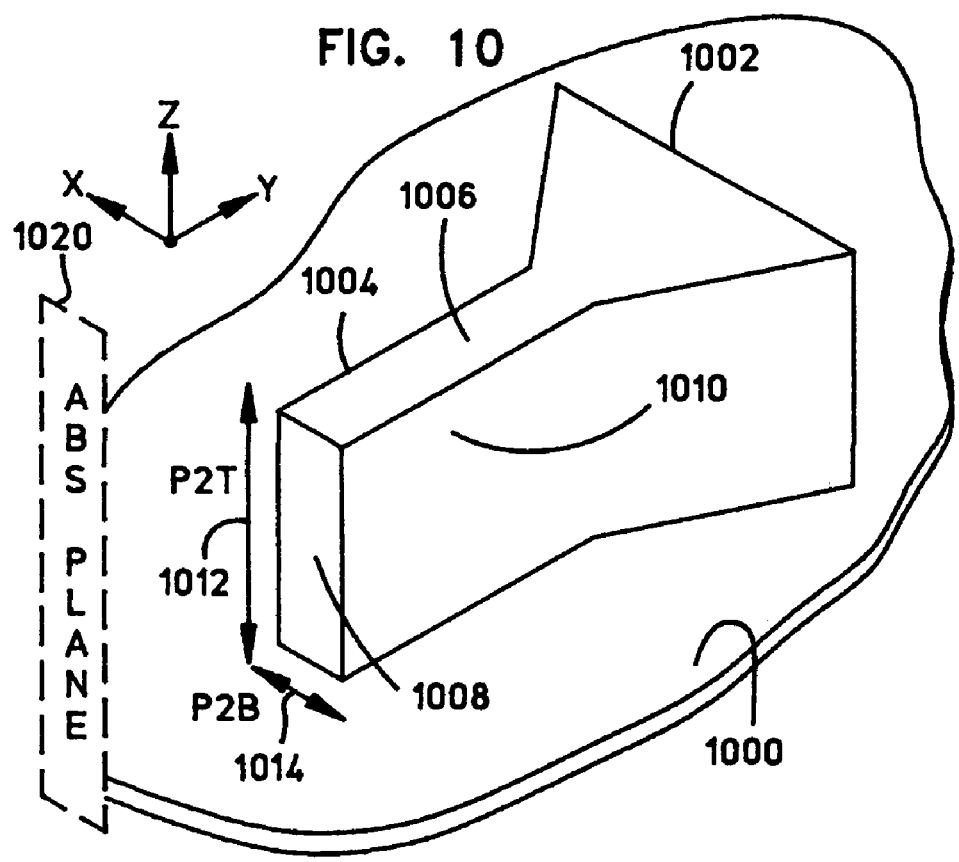
FIG. 10 is an enlarged isometric illustration of a pole tip of a second pole piece having a width ("P2B") that is less than its height ("P2T") which is normal a substrate on which it is formed.

FIG. 10 is an enlarged isometric illustration of a pole tip of second pole piece 1002 which is formed on a substrate 1000. The pole tip of second pole piece 1002 may be that pole tip 100 of second pole piece 94 described in relation to FIGS. 6–8. As shown in FIG. 10, the pole tip has a generally rectangular structure which forms a pole tip wall 1008 which is coplanar with an air bearing surface (ABS) plane 1020, a horizontal top wall which is coplanar with substrate 1000 but perpendicular to ABS plane 1020, and vertical side walls 1004 and 1010 which are perpendicular to both substrate 1000 and ABS plane 1020. Second pole piece 1002 has a high-aspect-ratio, where pole tip wall 1008 has a width ("P2B") 1014 that is less than its height ("P2T") 1012 which is normal substrate 1000. For example, the height-to-width ratio may be greater than four-to-one (4:1).

In FIG. 11, the pole tip of FIG. 10 is shown with its magnetic domain orientation 1116 caused by stress-anisotropy as apparent in the prior art. As shown, magnetic domain orientation 1116 along vertical side walls 1004 and 1010 of the pole tip is perpendicular to ABS plane 1020 and parallel with substrate 1000. An easy axis of the pole tip is similarly orientated perpendicular to ABS plane 1020 and parallel with substrate 1000. A driving field is provided through pole piece 1002 in directions 1150 that are aligned and in parallel with magnetic domain orientation 1116 and the easy axis of the pole tip. As apparent, magnetic domain orientation 1116 and the easy axis for second pole piece 1002 are unfavorable for efficient writing. Switching speed is reduced and is relatively slow since the initial torque exerted by the driving field is small on the magnetization due to the relatively small angle between the field and the magnetization.

FIG. 12 is an illustration of the pole tip of FIG. 10 with an ideal and desirable magnetic domain orientation 1202 according to the present invention. As shown, magnetic domain orientation 1202 along vertical side walls 1004 and 1010 of the pole tip is out-of-plane from substrate 1000 and in-plane with vertical side walls 1004 and 1010. An easy axis of the pole tip is similarly orientated to be out-of-plane from substrate 1000 and in-plane with vertical side walls 1004 and 1010. Being out-of-plane from substrate 1000, a direction 1204 of magnetic domain orientation 1202 forms an angle θ 1206 relative to substrate 1000. Ideally, this angle θ 1206 is 90° (i.e. parallel with ABS plane 1020 and normal to substrate 1000) for Hexagonal Close-Packed (HCP) materials. However, other angles θ 1206 may be utilized as will be described later in relation to FIGS. 14–16. Referencing the orientation axis in FIG. 12, magnetic domain orientation 1202 and the easy axis are oriented in direction 1204 that is parallel with the Y-Z plane, out-of-plane from the X-Y plane, and at angle θ 1206 relative the X-Y plane.

Thus, the driving field through second pole piece 1002 of FIG. 12 is provided in directions 1150 (i.e. along the y-axis) that are perpendicular to magnetic domain orientation 1202 and the easy axis. This driving field allows for the writing of data on a disk track 1208 having a track width 1210. As apparent, magnetic domain orientation 1202 and the easy axis for second pole piece 1002 are favorable for efficient writing. Switching speed is increased and is relatively fast since the initial torque exerted by the driving field is large on the magnetization due to the relatively large angle between the field and the magnetization. Thus, the field-plating and/or field-annealing overcomes the unfavorable stress-anisotropy with a more favorably oriented (averaged) crystalline-anisotropy. Whether the overall crystalline-anisotropy will sufficiently dominate depends on the particular pole materials utilized but, in any event, should still at least mitigate the unfavorable stress-anisotropy.

Figure 13:
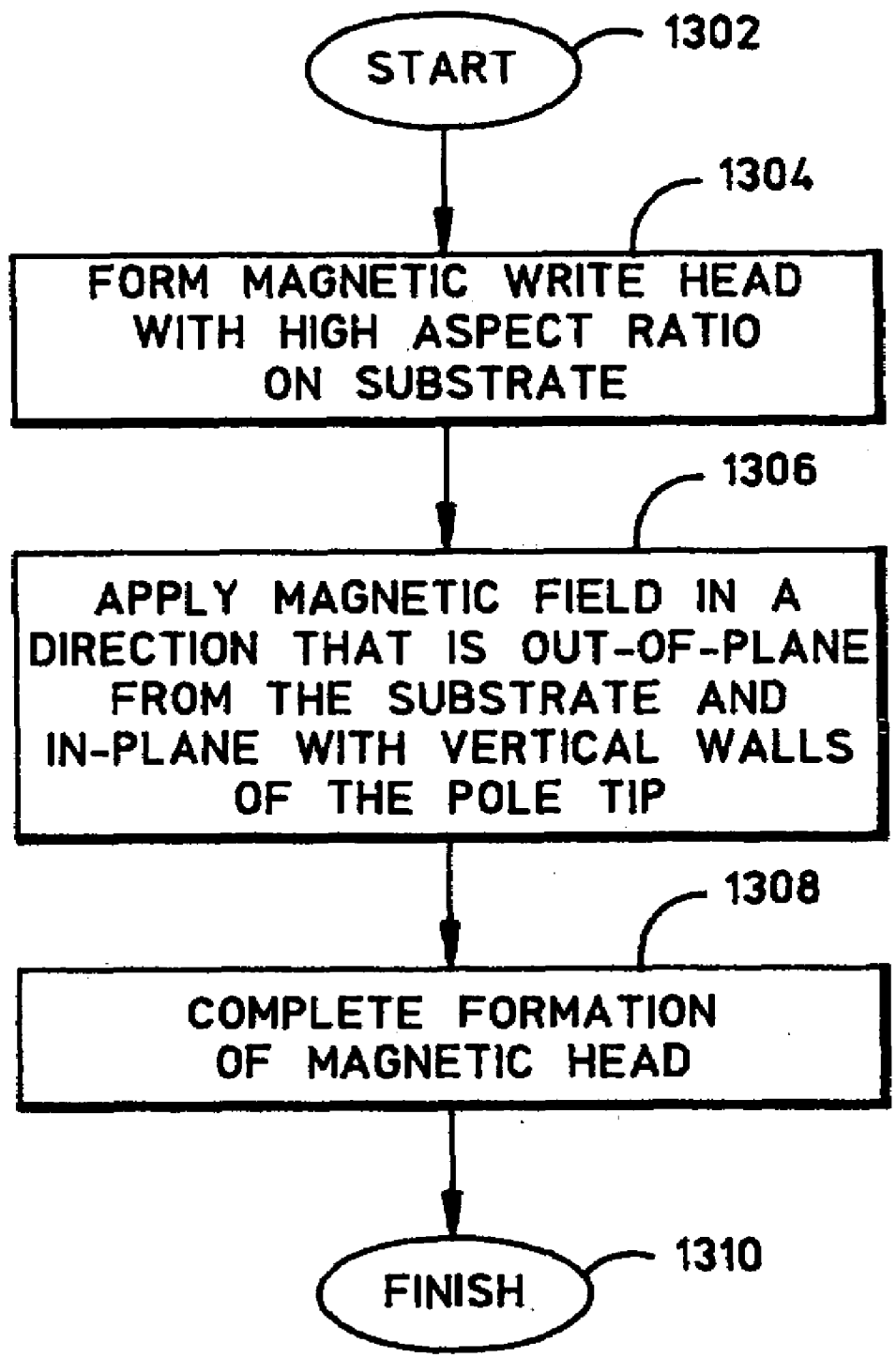
FIG. 13 is a flowchart which describes a method of making a pole piece by applying, during electroplating or annealing, a magnetic field in a direction which forms an angle θ out-of-plane from the substrate but in-plane with a wall of the pole tip which vertically projects from the substrate.

FIG. 13 is a flowchart which describes a method of making a magnetic head to achieve the magnetic domain orientation shown and described in relation to FIG. 12. A similar technique may be utilized to achieve the magnetic domain orientation shown and described later in relation to FIG. 15. Beginning at a start block 1302 of FIG. 13, a magnetic write head having a high-aspect-ratio is formed on a substrate (step 1304). The magnetic write head is formed of first and second pole pieces which are made of magnetic material. The formation of the pole pieces is typically performed using electroplating and annealing steps. In a high-aspect-ratio write head, the widths of the pole tips are less than their heights which are normal the substrate (see e.g. FIG. 10). In practice today, this height-to-width ratio is greater than four-to-one (4:1).

During the electroplating and/or annealing steps, a magnetic field is applied to the pole tip of the second pole piece in a direction that is out-of-plane from the substrate and in-plane with a side wall of the pole tip which vertically projects from the substrate (step 1306). Being out-of-plane from the substrate, the direction of the applied magnetic field forms an angle θ relative the substrate. Ideally, this angle θ is 90° for Hexagonal Close-Packed (HCP) materials. However, other angles θ may be utilized as will be described later in relation to FIGS. 14–16. As shown in FIG. 12, for example, a magnetic field is applied to the pole tip in direction 1204 that is out-of-plane from substrate 1000 but in-plane with vertical side walls 1004 and 1010. Being out-of-plane from substrate 1000, the direction 1204 of the applied magnetic field forms angle θ 1206 relative to substrate 1000. Referencing the orientation axis, the applied magnetic field is oriented in the Y-Z plane, out-of-plane from the X-Y plane, and at angle θ 1206 relative the X-Y plane as shown in FIG. 12. The formation of the magnetic head is then completed (step 1308 of FIG. 13) using conventional or other suitable techniques; the flowchart ends at a finish block 1310 of FIG. 13.

Figure 15:
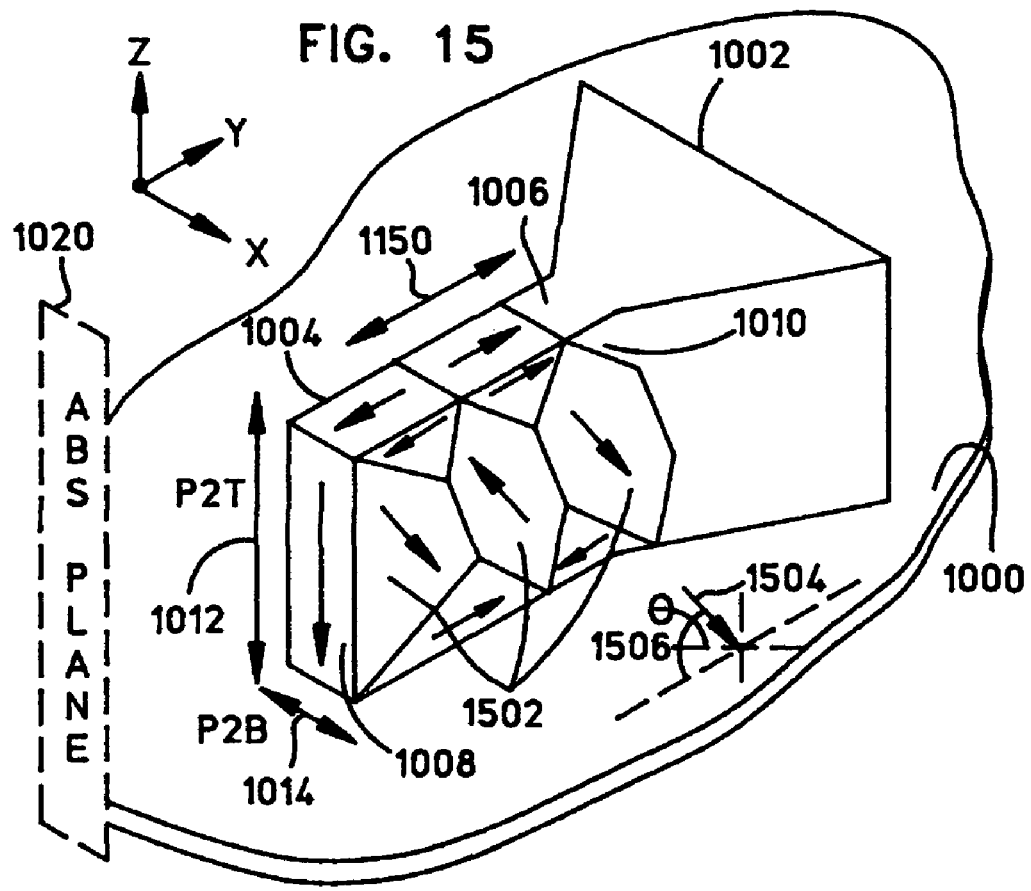
FIG. 15 is an illustration of the pole piece of FIG. 10 made of BCC or FCC materials and having a desirable magnetic domain orientation which is produced by applying, during electroplating or annealing, a magnetic field in a direction which forms an angle θ of between 40–60° (e.g. about 50°)

Referring now to FIG. 15, an illustration of the pole tip of FIG. 10 with a desirable magnetic domain orientation 1502 for Face-Centered Cubic (FCC) or Body-Centered Cubic (BCC) materials (e.g. nickel-iron or cobalt-iron) is shown. As shown, magnetic domain orientation 1502 along vertical side walls 1004 and 1010 is out-of-plane from substrate 1000 and in-plane with vertical side walls 1004 and 1010. An easy axis of the pole tip is similarly orientated. Being out-of-plane from substrate 1000, a direction 1504 of magnetic domain orientation 1502 forms an angle θ 1506 relative substrate 1000. For BCC materials, such as nickel-iron (NiFe) or cobalt-iron (CoFe), this angle θ 1506 is about 50°. However, other suitable angles θ 1506 within 40–60° may be utilized to achieve the same or similar results. Referencing the orientation axis in FIG. 15, magnetic domain orientation 1502 and the easy axis are oriented in direction 1504 that is parallel with the Y-Z plane, out-of-plane with the X-Y plane, and at angle θ 1206 relative the X-Y plane.

Thus, the driving field through second pole piece 1002 of FIG. 15 is provided in directions 1150 (i.e. along the y-axis) that are not collinear with magnetic domain orientation 1502 or the easy axis. As apparent, magnetic domain orientation 1502 and the easy axis for second pole piece 1002 are favorable for efficient writing. Switching speed is increased and is relatively fast since the initial torque exerted by the driving field is large on the magnetization due to the relatively large angle between the field and the magnetization. Thus, the field-plating and/or field-annealing overcomes the unfavorable stress-anisotropy with a more favorably oriented (averaged) crystalline-anisotropy. Whether the overall crystalline-anisotropy will sufficiently dominate depends on the particular pole materials utilized but, in any event, should still at least mitigate the unfavorable stress-anisotropy.

Figure 14:
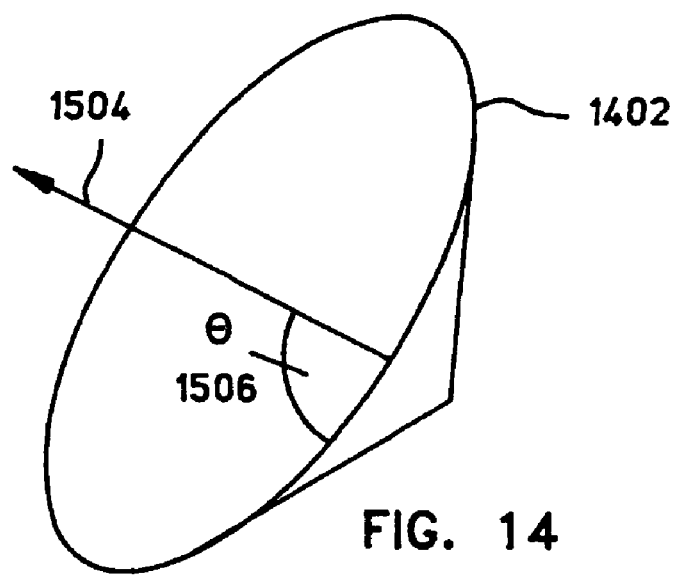
FIG. 14 is an illustration of a "hard-cone" for pole pieces made of Body-Centered Cubic (BCC) or Face-Centered Cubic (FCC) materials.
Figure 16:
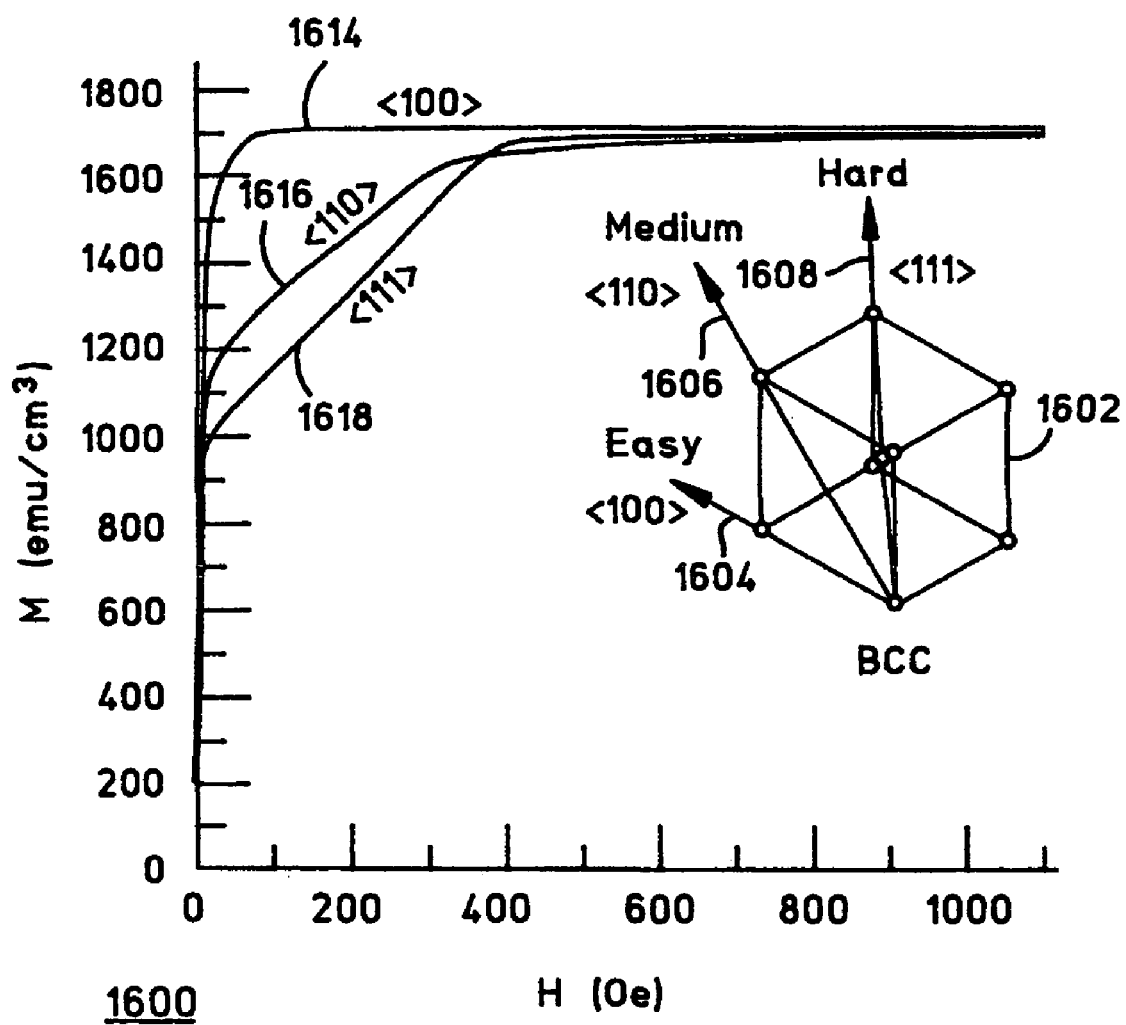
FIG. 16 is a graph which depicts the magnetization response to an applied magnetic field and an inset diagram for illustrating the inherent anisotropy of Body-Centered Cubic (BCC) materials.

FIG. 16 is a graph 1600 depicting the magnetization response to an applied magnetic field, and an inset diagram for illustrating the inherent anisotropy of Body-Centered Cubic (BCC) materials such as cobalt-iron (CoFe) and nickel-iron (NiFe). Although the diagram is directed to a BCC structure, similar analysis applies to a Face-Centered Cubic (FCC) structure. The illustration of FIG. 16 was obtained from B. D. Cullity, "Introduction to Magnetic Materials", Addison-Wesley, p. 209. A BCC atomic structure 1602 is associated with an easy axis 1604, a medium axis 1606, and a hard axis 1608. Easy axis 1604 corresponds to an easy axis curve 1614, medium axis 1606 corresponds to a medium axis curve 1616, and hard axis 1608 corresponds to a hard axis curve 1618. Referring to FIG. 14, an illustration of a "hard cone" 1402 with the easy axis direction 1504

(see also FIG. 15) at the angle θ of 50° for pole pieces made of such materials is shown. In field-plated and/or field-annealed polycrystalline materials of the present invention, the orientation of the cubic structure 1602 will be randomized with respect to easy axis 1604, which is fixed and aligned in the direction determined by the applied magnetic field during the plating/annealing. Thus, hard axis 1608 will be randomized in its direction by the polycrystallinity of the materials to form the "hard cone" 1402 of FIG. 14.

Figure 17:
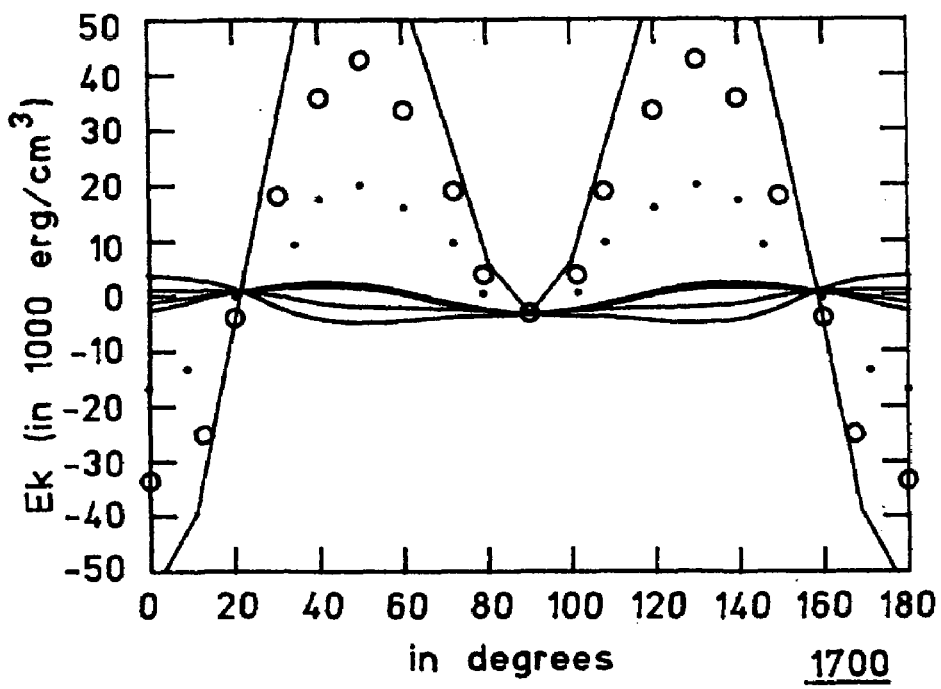
FIG. 17 is a graph which shows the anisotropy energy of nickel-iron (NiFe) polycrystalline material with a fixed axis.

FIG. 17 is a graph 1700 which shows the calculated crystalline anisotropy energy of nickel-iron (NiFe) polycrystalline material having a fixed axis <100>. The various curves depicted in graph 1700 are calculations corresponding to different relative compositions of the NiFe alloy. In graph 1700, 0° (as well as 180°) corresponds to easy axis 1604 of FIG. 16 or axis 1504 of FIG. 15. Graph 1700 shows that, in a polycrystalline material in which the orientation of the microcrystals (e.g. that shown in FIG. 16) are completely randomized with respect to fixed axis 1604, the anisotropy-energy increases when the overall magnetization rotates away from fixed axis 1604. The energy achieves a maximum at about 50° from fixed axis 1604 and decreases to an intermediate value at about 90° from fixed axis 1604. The peak in anisotropy energy at about 50° in graph 1700 corresponds to "hard cone" 1402 of FIG. 14.

Figure 18:
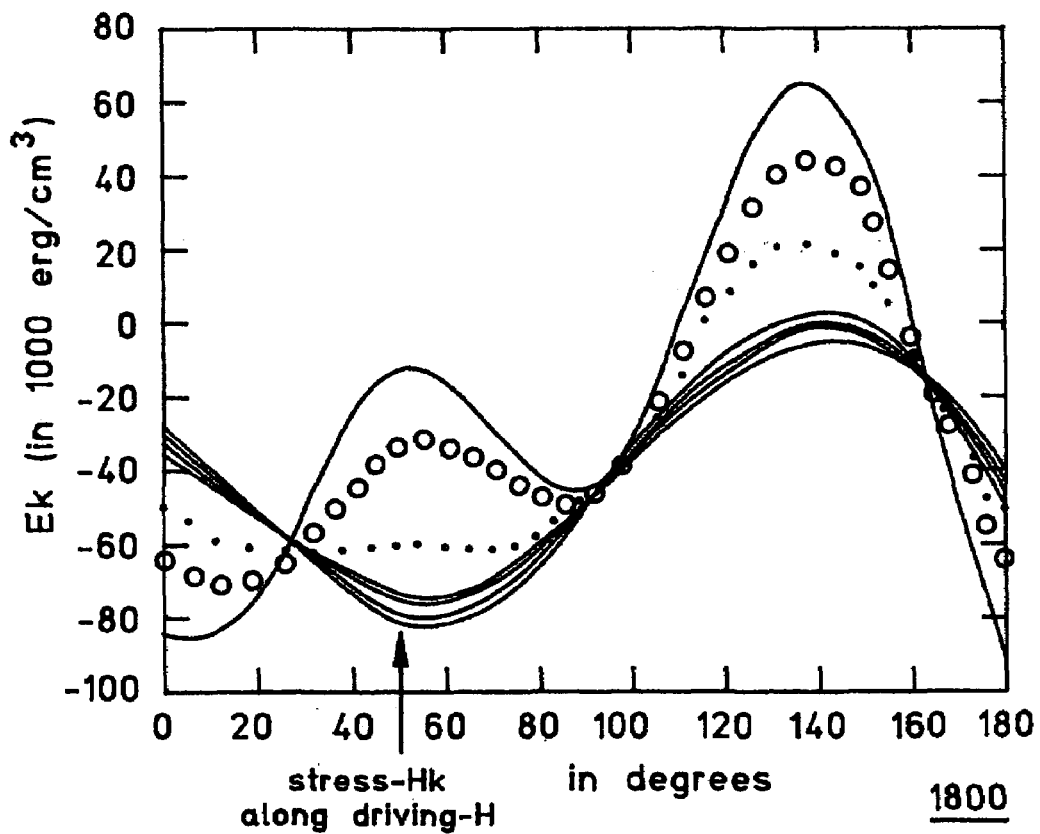
FIG. 18 is another graph which shows the anisotropy energy of the nickel-iron (NiFe) polycrystalline material with a fixed axis.

FIG. 18 is another graph 1800 which shows the combined crystalline and stress anisotropy energy of the nickel-iron (NiFe) polycrystalline material having a fixed axis <100>. The various curves depicted in graph 1800 are calculations corresponding to different relative compositions of the NiFe alloy. In graph 1800, the energy corresponding to a stress-anisotropy-field of 100 Oersteds is provided in addition to the crystalline anisotropy energy shown in FIG. 17. This stress-anisotropy-field is assumed to be orientated at about 50° from crystalline-anisotropy easy-axis 1604 of FIG. 16. This calculation is to simulate the situation described in relation to FIG. 15 in which the crystalline-easy-axis is orientated at angle θ=50° from substrate 1000 while the stress-anisotropy easy-axis is oriented in the unfavorable direction shown in FIG. 11. As apparent from the calculation plot, the combined crystalline and stress anisotropy energy still favors the magnetization to more readily align with the crystalline anisotropy easy axis (1604 in FIG. 16 or 1506 in FIG. 15) which is oriented in a favorable direction in FIG. 15 as opposed to the stress-anisotropy easy-axis which is oriented in an unfavorable direction in FIG. 11.

Figure 19:
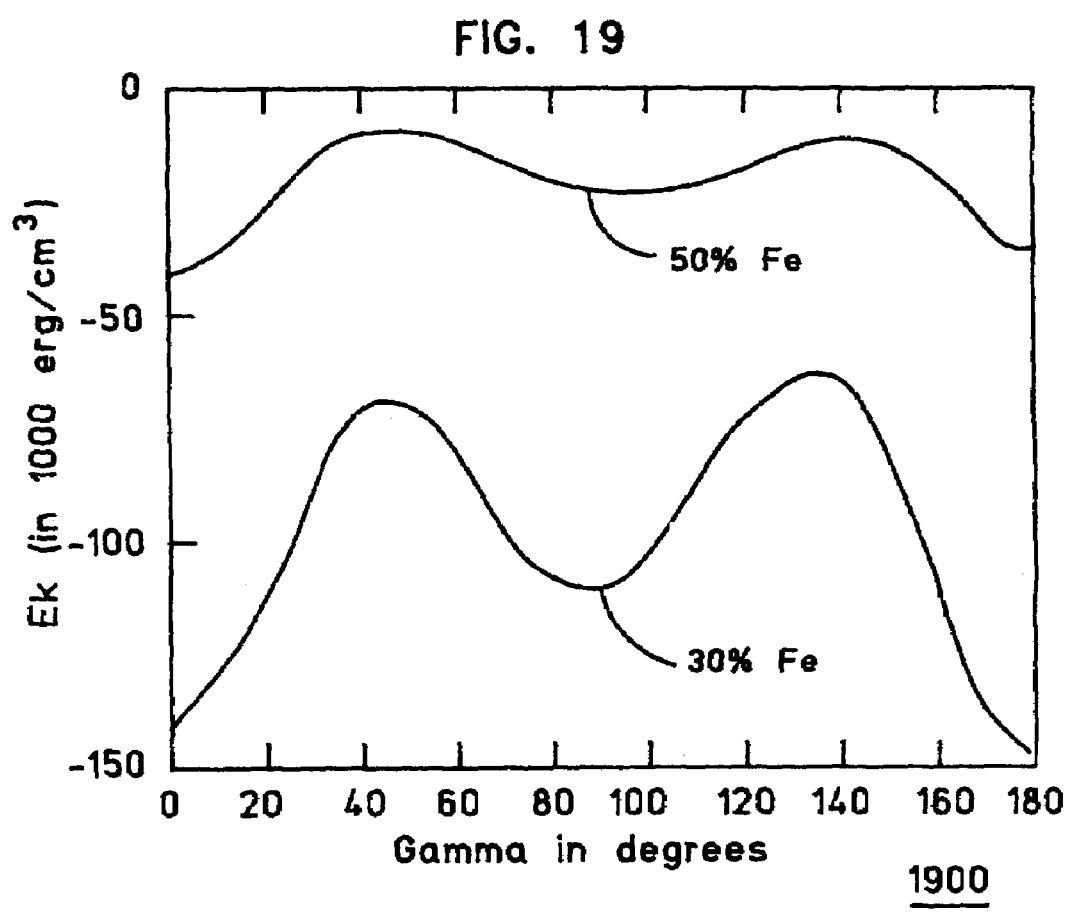
FIG. 19 is a graph which shows the anisotropy energy of cobalt-iron (CoFe) around a fixed axis.

FIG. 19 is a graph 1900 which shows the calculated crystalline anisotropy energy of cobalt-iron (CoFe) polycrystalline material having a fixed axis <100>. The conditions for this calculation are similar to that shown and described in relation to FIG. 17, with the exception that parametric-input values of cobalt-iron (CoFe) are used instead of nickel-iron (NiFe). Conclusions based on this material are, by-and-large, similar to that of nickel-iron (NiFe) described in FIG. 17.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A method of making a magnetic head, comprising:
    forming, over a substrate, a pole piece of a magnetic head with a high-aspect ratio;
    applying a magnetic field to a pole tip of the pole piece in a direction that is out-of-plane from the substrate and in-plane with a side wall of the pole tip which vertically projects from the substrate.

2. The method of claim 1, wherein the act of applying the magnetic field to the pole tip orients an easy-axis of the pole piece in the direction of the applied magnetic field.

3. The method of claim 1, further comprising:
    wherein the act of forming the pole piece comprises electroplating the pole piece over the substrate; and
    wherein the act of applying the magnetic field is performed during the act of electroplating the pole piece.

4. The method of claim 1, further comprising:
    annealing the pole piece; and
    wherein the act of applying the magnetic field is performed during the act of annealing the pole piece.

5. The method of claim 1, wherein the pole tip is formed to have a width that is less than a height of the side wall of the pole tip.

6. The method of claim 1, wherein the pole tip is formed to have a width that is at least two times less than a height of the side wall of the pole tip.

7. The method of claim 1, wherein the direction of the applied magnetic field is at an angle of 90° relative to the substrate.

8. The method of claim 1, wherein the direction of the applied magnetic field is at an angle of between 40–60° relative to the substrate.

9. The method of claim 1, wherein the direction of the applied magnetic field is at an angle of about 50° relative to the substrate.

10. The method of claim 1, further comprising:
    wherein the pole piece has an intrinsic crystalline structure that is cubic; and
    wherein the direction of the applied magnetic field is at an angle of between 40–60° relative to the substrate.

11. The method of claim 1, further comprising:
    wherein the pole piece is made of a material comprising at least one of nickel-iron and cobalt-iron; and
    wherein the direction of the applied magnetic field is at an angle of between 40–60° relative to the substrate.

12. A method of making a magnetic write head comprising:
    forming a pole piece of a magnetic head with a pole tip which has a width that is less than its height;
    applying a magnetic field to the pole tip in a direction that forms an angle θ relative to a substrate during an electroplating or annealing of the pole piece; and
    wherein the angle θ is out-of-plane from the substrate and in-plane with a side wall of the pole tip which vertically projects from the substrate.

13. The method of claim 12, wherein the act of applying the magnetic field to the pole tip orients an easy-axis of the pole piece at the angle θ.

14. The method of claim 12, wherein the width is at least two times less than the height.

15. The method of claim 12, wherein the angle θ is 90°.

16. The method of claim 12, wherein the angle θ is between 40–60°.

17. The method of claim 12, wherein the angle θ is about 50°.

18. The method of claim 12, further comprising:
wherein the pole piece has an intrinsic crystalline structure that is cubic; and
wherein the angle θ is between 40–60°.

19. The method of claim 12, further comprising:
wherein the pole piece is made of a material comprising at least one of nickel-iron and cobalt-iron; and
wherein the angle θ is between 40–60°.

20. A method of orienting an easy axis of a pole tip for improved writing efficiency, comprising:
electroplating or annealing a pole piece having a pole tip which has a width that is less than its height which is normal a substrate over which it is formed; and
applying a magnetic field to the pole tip in a direction that is out-of-plane from the substrate and in-plane with a side wall of the pole tip which vertically projects from the substrate, to thereby align an easy axis of the pole tip in the direction of the applied magnetic field.

21. The method of claim 20, wherein the direction forms an angle θ of 90° relative to the substrate.

22. The method of claim 20, wherein the direction forms an angle θ between about 40–60° relative to the substrate.

23. The method of claim 20, wherein the direction forms an angle θ of about 50° relative to the substrate.

24. The method of claim 20, further comprising:
wherein the pole piece has an intrinsic crystalline structure that is cubic; and
wherein the direction forms an angle θ of between 40–60° relative to the substrate.

25. The method of claim 20, further comprising:
wherein the pole piece comprises at least one of NiFe and CoFe; and
wherein the direction forms an angle θ of about 50° relative to the substrate.

26. The method of claim 20, wherein the width is at least two times less than the height of the pole tip.

27. The method of claim 20, wherein the width is four or more times less than the height of the pole tip.

* * * * *